Nov. 30, 1954   L. RENART   2,695,534
SPEED CHANGER
Filed June 26, 1951   2 Sheets-Sheet 1

INVENTOR
LOUIS RENART
BY:
Hazeltine, Lake & Co.
AGENTS

Nov. 30, 1954 L. RENART 2,695,534
SPEED CHANGER
Filed June 26, 1951 2 Sheets-Sheet 2
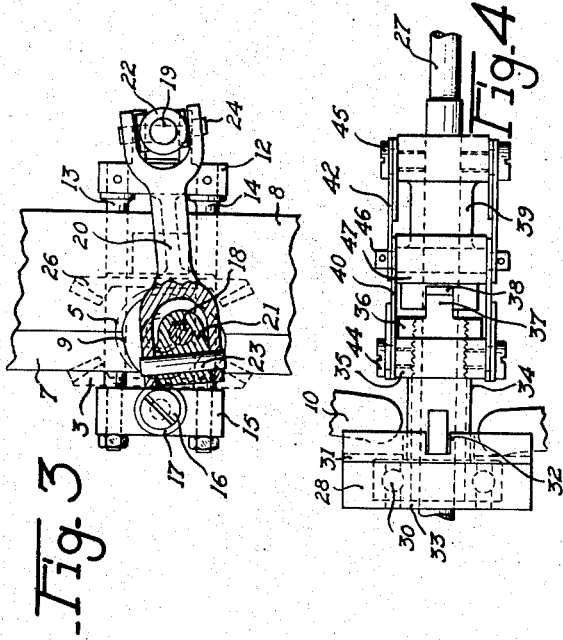
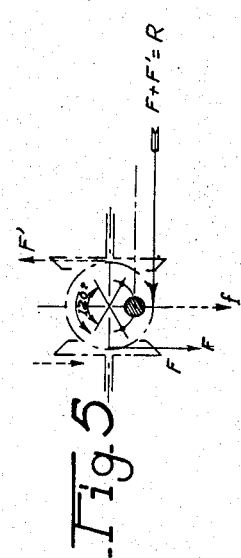
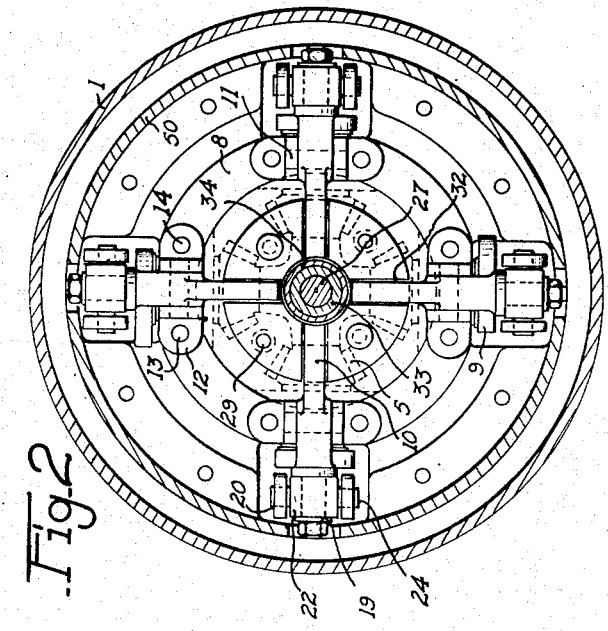
INVENTOR
LOUIS RENART
BY:
Hazeltine, Lake & Co.
AGENTS

United States Patent Office 2,695,534
Patented Nov. 30, 1954

2,695,534
SPEED CHANGER
Louis Renart, Paris, France

Application June 26, 1951, Serial No. 233,529

Claims priority, application France July 6, 1950

7 Claims. (Cl. 74—752)

The present invention relates to speed changers of the type in which both speed and torque are transmitted from the input to the output shaft through a differential device.

The main object of the present invention is to provide a speed changer capable of giving the automatic transmission from a power shaft having a constant or variable angular velocity to an output shaft the angular velocities of which vary inversely as the reaction torques; for this purpose, the speed changer consists of a differential device wherein the input shaft is fixed with one of the pair of sun gears, the other sun gear being mounted idle and fast with a member reacting against the planet pinions proper, according to the speed of this other sun gear, through the medium of eccentrics fixed on these planet pinions and of a link-and-lever connecting device, these levers having movable fulcrums and being controlled by cam members so that they will transmit the reaction from the reaction member only in a sense such as to counter the direction of rotation of the planet pinions. When the reaction force holds the planet pinions against motion the mechanism acts no more as a speed changer but only as a rigid centrifugal coupling.

Preferably, the reaction member consists of a centrifugal governor mounted on the axis of the other sun gear.

According to the invention, the relative speeds of the output shaft are taken from the planet-carrier drum. If it is desired to increase the reduction ratio this planet-carrier drum may be connected to a reducing gear train of known type or, in tandem, to another speed changer according to the invention.

The following description made with reference to the affixed drawings given solely by way of non-restrictive examples will afford a clear understanding of the manner in which the invention can be carried out practically.

Fig. 2 is a cross-section along the line II—II of Fig. 1.

Fig. 3 is a plane view of the eccentric, link and cam connecting device.

Fig. 4 is a plane view of the centrifugal governor.

Fig. 5 illustrates diagrammatically the forces acting upon the planet pinions.

Fig. 6 illustrates diagrammatically the tanden mounting of two speed changers.

Figure 1:
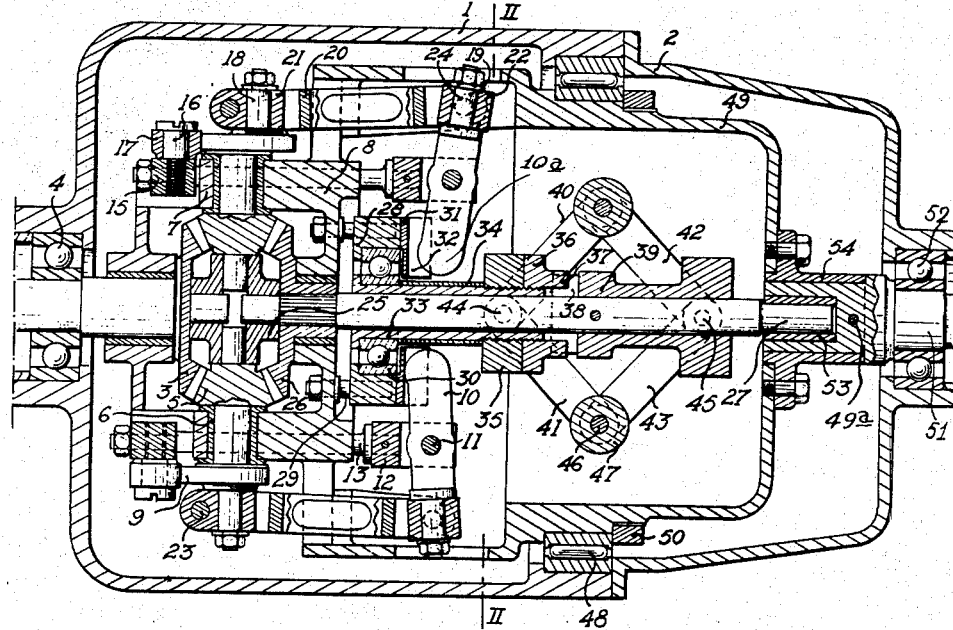
Fig. 1 is a longitudinal section of a speed changer according to the invention.

In the embodiment illustrated in Fig. 1 the outer casing consists of a pair of shell 1, 2, not an integral part of the mechanism proper and is constructed according to each specific case of application.

The speed changer comprises a differential the input sun gear 3 of which, journaled in an input bearing 4 centered in casing 1, meshes with a plurality of planet pinions 5, four in the embodiment illustrated, rotated in bushings 6 of the differential drum. The latter consists of a pair of ring members 7, 8 assembled together to permit the mounting of the planet pinions 5 and to form a drum 7—8.

The latter carry cam members 9 controlling the movements of reaction levers 10 fulcrumed on pins 11 of straps 12 fast with slides 13, 14. These are braced at their opposite ends by cross-pieces 15 carrying pins 16 on which are trunnioned rollers 17 acting as followers to cam members 9.

Cam members 9 carry in addition eccentrics 18. The outer arms of the reaction levers 10 terminating in pins 19 are connected to eccentrics 18 through the medium of links 20 having strap-shaped ends.

On eccentrics 18 and pins 19 are mounted Cardan members 21, 22 fulcrumed on pins 23, 24 so as to permit the oscillation of links 20 in all directions.

A central cross-member 25 acts as a common bearing to input sun gear 3, planet pinions 5, and idle sun gear or idler gear 26 keyed on a shaft 27.

A ring member 28 slidably engaging slide-bars 29 fixed on drum 8 holds the outer race of a bearing 30 through the intermediary of a flange 31 formed with grooves 32 engaged by reaction levers 10.

A central socket 33, rotatably fast with shaft 27 as hereinafter indicated but adapted to be slidably moved therealong, acts to fix the inner race of bearing 30 through a distance piece 34, a nut 35 and a locking nut 36 formed with a pair of tenons 37 engaging grooves or mortises 38 formed in turn in a hub member 39 keyed on shaft 27 for facilitating the drive thereof, the connection between shaft 27 and socket 33 being obtained by means of said tenons 37 engaging said mortises 38.

Links 40, 41, 42, 43 of a centrifugal governor are fulcrumed on nut 35 and hub 39 by means of pins 44, 45; their opposite ends are fulcrumed on pins 46 and carry weights 47. A bearing 48 fitted in casing 1 and held by casing 2 carries a bell-shaped member 49 fast with drum 8 and fixed by a ring nut 50. The output shaft 51 is journaled in casing 2 through a bearing 52. The governor-carrying shaft 27 is trunnioned in a journal 53 fitted inside shaft 51; a centering flanged socket 54 fixed on member 49 is keyed by pin 49a on shaft 51 in order to ensure the drive.

The mechanism described above operates as follows:

If V is the speed of the input sun gear 3, V' that of the planet pinion 5, v' that of the idler sun gear 26 and of shaft 27, and v that of drum 7—8 and of shaft 51, and if further R is the ratio between the teeth number of input sun gear 3 and of planet pinions 5, and if said input sun gear 3 and the idler sun gear 26 have the same number of teeth, said various speeds are interconnected by the following relations:

$$V' = R(V-v) \quad v' = 2v - V$$

From the above is obtained:

$$v = \frac{RV - V'}{R} = \frac{V + v'}{2}$$

The speed changer is assumed to be mounted on a motor-car. If the motor-car is stopped and braked thus holding shaft 51, the speed $v$ of which is equal to 0, and if the input sun gear 3 is put in rotation at a speed $V_0$, minimum speed of the vehicle engine, shaft 27 starts to rotate in a reverse direction with respect to said gear 3 thus driving the centrifugal governor. The weights 47 diverge while displacing the sliding ring member 28 on its slide bars 29 by means of links 40 to 43, thus moving said ring member 28 as well as flange 31 away from input sun gear 3. The planet pinions 5 are rotary driven at a speed $V' = RV_0$ since $v = 0$, and the eccentrics 18 by means of Cardan members 21 and 22 and of links 20 drive the levers 10 in oscillation about their axes 11. Simultaneously, said axes 11 are moved under the action of cam members 9 on rollers 17 which rollers displace the slides 13 and 14 through the ring members 7—8. According to the profile of said cam members, the heads 10a of levers 10 intermittently bear on the flange 31 respectively within the grooves 32, said flange imposing a resistance to the displacement of said levers.

Practically the input sun gear 3 of the speed changer is directly connected to the vehicle engine and the output shaft 51 is disconnected at rest from axle shaft by means of a sliding dog (not shown). If said sliding dog is moved for connecting output shaft 51 to axle shaft, as long as output shaft 51 is maintained in a standstill condition, i. e. as long as the motor-car is stopped and braked, the speed $v'$ of the idler sun gear 26 is equal and opposite to the speed $V_0$ of the input sun gear 3; the planet pinions rotate in spite of the reaction torque resulting from the application to said pinions of the force generated by the centrifugal governor, by means of the assembly including eccentrics 18, cam members 9, rollers 17, links 20, reaction levers 10, flange 31 and slides 13—14. Said assembly will be termed hereinafter "reaction assembly."

As soon as the braking action in the motor-car is released and the vehicle engine is accelerated, the load torque C applied to shaft 51 decreases, the resistance imposed by flange 31 to the displacement of the levers under the action of governor tends to generate through links 20 and eccentrics 18 a deceleration for planet pinions 5 which then rotate at a speed $V'_1=R(V-v_1)$, as stated supra, V and $v_1$ being respectively the speeds of input sun gear 3 and output shaft 51. Consequently, said planet pinions tend to rotate the ring members 7—8 and the output shaft 51 in the same direction as that of input gear 3. The motor-car starts and its speed increases while the load torque decreases. Said deceleration of the planet pinions 5, in turn, generates a slackening action for idler sun gear 26, the negative speed $v'_1$ of which decreases and tends to be reduced to zero, whereby shaft 27 gradually stops. If $C_1$ is the decreasing load torque and K the power output, during the starting period the following relation exists: $K=v_1.C_1$.

When shaft 27 stops, the speed $v'_2$ of idler sun gear 26 is zero. The planet pinions 5 driven by the input sun gear 3 roll about the idler sun gear 26 at a speed $V'_2=RV-Rv_2$, as stated supra, the speed $v_2$ of shaft 51 being equal to $$\frac{V}{2}$$

The conversion of torque takes place within the ratio 2 : 1 because the torques vary inversely as the velocities; the governor being still, no reaction is applied against the planet pinions. This position corresponds to that of the second speed on a conventional change speed gear. If $C_2$ is the value of the corresponding load torque then the following relation exists: $v_2.C_2=K$.

From this time as soon as the motor-car runs on a flat road or on a downward sloping road, the load torque applied to shaft 51 continues to decrease, shaft 27 starts to rotate in the same direction as the direction of rotation of input sun gear 3 until said shaft 27 rotates at the same speed $v_3=V$ as said gear 3. The speeds V and $v_3$ being equal, the planet pinions 5 have a speed equal to zero and, therefore, these pinions are in a standstill condition. The drum 8 is driven at a speed $v_3$ equal to the rotary speed V of input sun gear 3 and shaft 27. The torque transmitted to shaft 51 which is equal to the corresponding load torque $C_3$, is equal to that furnished by input sun gear 3, which corresponds to the direct drive for a conventional change speed gear. Reaction levers 10 are prevented, under forward drive of gear 26 and governor from oscillation, two of said levers remaining in engagement with flange 31 and transmitting the reaction developed by the governor to their respective planet pinions. A static equilibrium is attained for planet pinions 5 and for the reaction assembly. The following relations exist at that time:

$$v_3.C_3=K \text{ and}$$

$$C_3=\frac{C_2}{2}$$

In order to attain said static equilibrium, it is necessary, as illustrated in Figure 5, that the reaction R produced by the centrifugal governor be equal to the sum of the tangential stresses F and F' acting upon the driving and driven pinions, when the ratio between both torques is 1 : 1 and their speed equal.

When planet pinions 5 are held against motion, the mechanism operates as a rigid coupling without any slipping.

As hereinabove indicated the driving torque of input sun gear 3 and the load torque $C_3$ applied to output shaft 51 and to drum 7—8 are equal and their ratio is equal to 1 : 1, while the centrifugal governor which rotates at the speed V of said input sun gear 3 generates a force, which is applied to planet pinions 5 by the reaction assembly for generating a reaction torque which is equal and opposed to the driving torque applied to said planet pinions 5 by said input sun gear 3. Said force is termed "reactional power" of the governor.

This reactional power of the centrifugal governor being determined according to the formula $F=m\omega^2R$, the weights 47 thereof may be calculated with a great accuracy for given input power and maximum velocity.

Briefly, if the speed V of the input sun gear 3 is assumed to be constant between the starting of the motor-car and the direct drive for which the centrifugal governor rotates at a speed V equal and in the same direction as that of input sun gear 3, intermediate variable speeds $v_i$ are automatically obtained for the output shaft 51 in accordance with the instantaneous load torque $C_i$ applied to said shaft 51 according to the relation: $K=v_i.C_i$.

A true dynamic equilibrium is obtained for planet pinions 5 for any constant load torque $C_c$ which is applied to output shaft 51 and which is greater than $C_3$, the corresponding speed $V'_c$ of said planet pinions 5 being determined by the following relations:

$$v_c.C_c=K \text{ and } V'_c=R(V-v_c)$$

If the engine of the motor-car rotates at a speed which is different from that for which the speed of the input sun gear 3 is equal to V, at a greater speed for example, said gear 3 rotates at a speed $V_1>V$ and develops a greater output $K_1$. Consequently a load torque $C'$ which differs from C can be balanced for any value of the new speed of output shaft 51. However for speeds $V_1>V$ the speed changer will substantially remain in a state of static equilibrium since the reaction induced by the centrifugal governor can be twice that induced by said governor for the speed V, because said reaction varies as a function of the square of the angular speed.

If, when the static equilibrium is attained for planet pinions 5, the torque applied to shaft 51 increases, due for example to a braking action exerted on the vehicle or to the running of said vehicle on an upward sloping road, said static equilibrium is destroyed, the speed $v$ of shaft 51 decreasing, which induces a decrease in speed $v'$ of idler sun gear 26. Such a decreasing of $v'$, generates a corresponding slackening effect on shaft 27 until a dynamic equilibrium is attained for a certain speed $v'$ of the shaft 27.

If the increasing load torque applied to output shaft 51 has a value $C_4$ comprised between $C_3$ and $C_2$, the corresponding speed $v'_4$ of shaft 27, as hereinabove indicated, has the same direction than that of the input sun gear 3 and is comprised between $v_3=V$ and $v_2=0$. If the increasing torque attains a value equal to $C_2$ the speed $v'_2$ of shaft 27 is equal to zero. Finally, if the increasing torque applied to shaft 51 attains a value $C_5$ greater than $C_2$, the corresponding speed $v'_5$ of shaft 27, as hereinabove indicated, has a reverse direction to that of the speed of the input sun gear 3 and is comprised between $v'_2=0$ and $v'_1=-V_0$. An intermediate speed $v$ of the output shaft 51 is maintained as long as the corresponding new torque C has a constant value.

In a conventional change speed gear, for varying the speed, different ratios of gears are provided. In the speed changer according to this invention, with a view to obtaining the same result, the force component of the torque is modified, which force in the present case is generated by the centrifugal governor. The action of said centrifugal governor modifies the ratio existing between the driving torque applied to the planet pinions by the input sun gear 3 and the reaction torque resulting from the transmission to said planet pinions of the force generated by said governor by means of the reaction assembly, which allows to obtain the speed change of said planet pinions and, by kinematic relation, that of the output shaft.

Due to its particular construction, the speed changer according to the invention acts successively as torque transformer and as rigid coupling, which permits of dispensing with the conventional clutch means generally required between the engine and the motor-car transmission in order to drive the latter from the starting to its maximum speed. In fact, only a single operation of the sliding dog located rearwardly of the speed changer is necessary, to automatically obtain a constant equilibrium between the speed of the output shaft and the load torque, from the starting to the maximum speed of the motor-car, without any further operation of the sliding dog, while in a conventional transmission it is necessary to operate the clutch for passing from a drive to a different drive.

Preferably each planet pinion 5, through the medium of eccentric 18, connecting link 20 and reaction lever 10 bearing on flanges 31, receives a reaction force which lasts one-third of a revolution, that is 120°, whereby this reaction force will act in a direction opposite to the direction of rotation of these planet pinions. The time during which reaction lever 10 engages ring member 28 is conditioned by the shape of cam member 9 fast with the planet pinion. Then, still under the influence of the shape of cam member 9, lever 10 will progressively disengage itself from flange 31, during an angular displacement of 60°, and remain disengaged during an angular displacement of 120°, when the reaction stress from the governor acts in the same direction as the direction of rotation of the planet pinion; the reaction lever 10 being subsequently restored during the last 60° corresponding to the end portion of one revolution so as to resume its bearing against flange 31.

In an arrangement comprising four planet pinions, the latter being angularly spaced by 90° from one another as illustrated in Fig. 2, there always is one pair of diametrically opposite planet pinions in meshing engagement so as to avoid any lack of balance.

Figure 7:
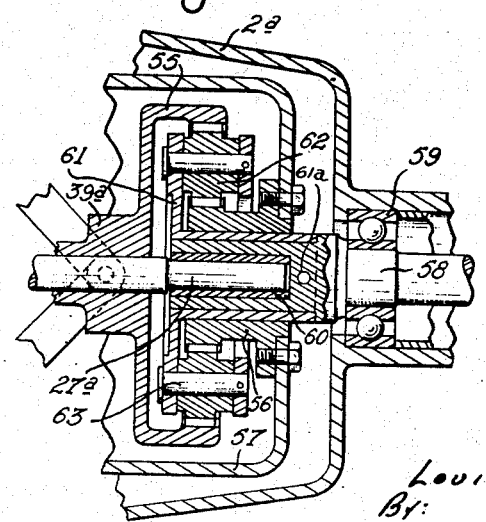
Fig. 7 is a partial sectional view of a speed changer according to the invention coupled with a reducing gear.

The reduction ratio may be further increased by coupling the speed changer with any known type of reducing gear, such as the one illustrated in Fig. 7. The hub member 39a is carried by the orbital gear 55 of a reducing device. Said device comprises a sun gear 56 mounted on a shell 57 connected with the ring member 8 of the differential device and which is supported by the casing 1 in the same manner as is supported the bell-shaped member 49 in the embodiment shown in Fig. 1. The driven shaft 58 is supported within the casing 2a by means of a bearing 59, while the idle shaft 27a carries the centrifugal governor and is journaled in a bearing 60 housed in a recess formed in the output shaft 58. On said shaft 58 is keyed by a pin 61a a spider 61 carrying pins 63 on which are journaled the planet pinions 62 of the reducing device. The operation of said device is similar to that of the speed changer illustrated in Fig. 1.

Instead of coupling the speed changer to a reducing gear, the increase in the reduction ratio may be obtained by coupling two speed changers in tandem as illustrated in Fig. 6. The first speed changer, consisting of an input sun gear 3, an idle sun gear 26, planet pinions 5, idle shaft 27 and centrifugal governor 47, has its planet-carrier drum 8 connected directly with the input sun gear 3b of another speed changer which, through its idle sun gear 26b, governor 47b and planet pinions 5b, drives the output shaft 51 fast with its planet-carrier drum 8b.

It will readily be understood that many modifications may be brought to the embodiments illustrated, without departing from the scope of this invention.

What I claim is:

1. A speed changer capable of giving automatic transmission of torque from a power shaft having a constant or variable angular velocity to an output shaft, the angular velocities of which vary inversely as the reaction torques, comprising, in combination, a differential device having an input gear connected with the power shaft, an idler gear, a plurality of planet pinions meshing with said gears and a ring member within which said pinions are rotatably mounted, an output shaft connected with said ring member and which is aligned with said power shaft, means for generating reactions directed parallel to the common axis of said shafts according to the speed of said idler gear, and means for transmitting the axial reactions given by said generating means to said planet pinions in a direction such as to counter the direction of rotation of said planet pinions.

2. A speed changer, according to claim 1, wherein the means for transmitting the axial reactions comprises eccentrics respectively connected to the planet pinions, a link-and-lever connecting device having links freely mounted respectively on said eccentrics and two arm levers having substantially central pivotal axes and universally coupled respectively by one of their arms with the free ends of said links, and said substantially central pivotal axes of said levers being movable substantially parallel with the common axis of said shafts, means for moving said axes, and means for intermittently contacting the second arms of said levers with the device generating the axial reaction.

3. A speed changer, according to claim 2, wherein the means for moving the pivotal axes of the levers comprises cams fixedly mounted with respect to the eccentrics, slide devices reciprocatingly mounted on the planet carrier ring member substantially parallel to the common axis and carrying respectively the central pivotal pins of the levers, and rollers respectively carried by said slide devices for bearing on said cams, the shape of each of said cams being determined so that the corresponding lever is actuated by the generating device for a part of each revolution corresponding at the most to an angle of 180° during which the axial reaction transmitted to said lever opposes the direction of rotation of the planet pinions.

4. A speed changer, according to claim 2, wherein the device generating the axial reaction and the means for effecting the intermittent contact between the second arms of the levers and said device comprise a centrifugal governor having a slide acting upon the second arms of the levers and which slide is rotatably fast with the planet carrier ring member.

5. A speed changer capable of giving automatic transmission of torque from a power shaft having a constant or variable angular velocity to an output shaft the angular velocities of which vary inversely as the reaction torques, comprising, in combination, a differential device having an input sun gear connected with the power shaft, an idler sun gear, a plurality of planet pinions meshing with said sun gears and a ring member within which said pinions are rotatably mounted, an output shaft connected with said ring member and which is aligned with said power shaft, eccentrics respectively connected to the planet pinions, a link-and-lever connecting device having links freely mounted respectively on said eccentrics and two arm levers having substantially central pivotal axes and universally coupled respectively by one of their arms with the free ends of said links, the pivotal axes of said levers being movable substantially parallel with the common axis of said shafts, cams fixed with respect to the eccentrics, slide devices reciprocatingly mounted on the planet carrier ring member substantially parallel to the common axis and carrying respectively the central pivotal pins of the levers, rollers respectively carried by said slide devices for bearing on said cams, an idle shaft supporting said idler sun gear, a centrifugal governor connected with said idle shaft, aligned with said power and output shafts and having a slide adapted to intermittently act on the second arms of the levers, said slide being rotatably fast with the planet carrier ring member, and the shape of each of said cams being determined so that the second arm of each lever bears upon said slide for a part of each revolution corresponding at the most to an angle of 180° during which the axial reaction transmitted to said lever opposes the direction of rotation of the planet pinions.

6. A speed changer capable of giving automatic transmission of torque from a power shaft having a constant or variable angular velocity to an output shaft, the angular velocities of which vary inversely as the reaction torques, comprising, in combination, a differential device having an input gear connected with the power shaft, an idler gear, a plurality of planet pinions meshing with said gears and a ring member within which said pinions are rotatably mounted, an output shaft aligned with said power shaft, a reducing device interconnecting said output shaft and said ring member, means for generating reactions directed parallel to the common axis of said shafts according to the speed of said idler gear, and means for transmitting the axial reactions given by said generating means to said planet pinions in a manner to oppose the rotary movement of said planet pinions.

7. A speed changer capable of giving automatic transmission of torque from a power shaft having a constant or variable angular velocity to an output shaft the angular velocities of which vary inversely as the reaction torques, comprising, in combination, a differential device having an input sun gear connected with the power shaft, an idler sun gear, a plurality of planet pinions meshing with said sun gears and a ring member within which said pinions are rotatably mounted, an output shaft aligned with said power shaft, a reducing device interconnecting said output shaft and said ring member, eccentrics respectively connected to the planet pinions, a link-and-lever connecting device having links freely mounted respectively on said eccentrics and two arm levers having substantially central pivotal axes and universally coupled respectively by one of their arms with the free ends of said links, the pivotal axes of said levers being movable substantially parallel with the common axis of said shafts, cams fixedly mounted with respect to the eccentrics, slide devices reciprocatingly mounted on the planet carrier ring member substantially parallel to the common axis and carrying respectively the central pivotal pins of the levers, rollers respectively carried by said slide devices for bearing on said cams, an idle shaft supporting said idler sun gear, a centrifugal governor connected with said idle shaft, aligned with said power and output shafts and having a slide adapted to intermittently act on the second arms of the levers, said slide being rotatably fast with the planet carrier ring member, and the shape of each of said cams being determined so that the second arm of each lever bears upon said slide for a part of each revolution corresponding at the most to an angle of 180° during which the axial reaction transmitted to said lever opposes the direction of rotation of the planet pinions.

References Cited in the file of this patent

UNITED STATES PATENTS

| Number | Name | Date |
|---|---|---|
| 1,760,850 | Remington | May 27, 1930 |
| 1,776,469 | Gardner | Sept. 23, 1930 |
| 1,990,786 | Horowitz | Feb. 12, 1935 |
| 2,022,689 | Rainsford | Dec. 3, 1935 |
| 2,118,423 | Timmerman | May 24, 1938 |
| 2,157,465 | Smitt | May 9, 1939 |
| 2,174,835 | Rainsford | Oct. 3, 1939 |

FOREIGN PATENTS

| Number | Country | Date |
|---|---|---|
| 9,024 | Denmark | Nov. 12, 1906 |
| 266,056 | Italy | July 17, 1929 |
| 566,748 | Germany | Dec. 20, 1932 |